United States Patent [19]
Thompson et al.

[11] 3,969,186
[45] July 13, 1976

[54] NUCLEAR FUEL ELEMENT

[75] Inventors: John R. Thompson, San Jose, Calif.;
Trevor C. Rowland, Halden, Norway

[73] Assignee: General Electric Company, San Jose, Calif.

[22] Filed: Feb. 11, 1974

[21] Appl. No.: 441,131

[52] U.S. Cl. ............................ 176/68; 176/82; 176/91 R
[51] Int. Cl. ............................ G21c 3/20
[58] Field of Search ............... 176/68, 82, 91 R

[56] References Cited
UNITED STATES PATENTS

| | | | |
|---|---|---|---|
| 3,198,711 | 8/1965 | McPartland et al. | 176/68 |
| 3,211,930 | 10/1965 | Clement et al. | 176/68 |
| 3,262,860 | 7/1966 | Zebroski | 176/91 R |
| 3,291,700 | 12/1966 | Brossa et al. | 176/82 |
| 3,409,504 | 11/1968 | Bailly et al. | 176/82 |
| 3,501,337 | 3/1970 | Webb et al. | 176/82 |

FOREIGN PATENTS OR APPLICATIONS

| | | | |
|---|---|---|---|
| 859,206 | 1/1961 | United Kingdom | 176/82 |
| 1,187,929 | 4/1968 | United Kingdom | 176/82 |

*Primary Examiner*—Stephen C. Bentley
*Attorney, Agent, or Firm*—Ivor J. James, Jr.; Sam E. Laub; Samuel E. Turner

[57] ABSTRACT

A nuclear fuel element for use in the core of a nuclear reactor is disclosed. A heat conducting, fission product retaining metal liner of a refractory metal is incorporated in the fuel element between the cladding and the nuclear fuel to inhibit mechanical interaction between the nuclear fuel and the cladding, to isolate fission products and nuclear fuel impurities from contacting the cladding and to improve the axial thermal peaking gradient along the length of the fuel rod. The metal liner can be in the form of a tube or hollow cylindrical column, a foil of single or multiple layers in the shape of a hollow cylindrical column, or a coating on the internal surface of the cladding. Preferred refractory metal materials are molybdenum, tungsten, rhenium, niobium and alloys of the foregoing metals.

1 Claim, 8 Drawing Figures

NUCLEAR FUEL ELEMENT

BACKGROUND OF THE INVENTION

This invention relates broadly to an improvement in nuclear fuel elements for use in the core of nuclear fission reactors, and more particularly to improved nuclear fuel elements having a refractory metal liner incorporated in the fuel element between the cladding and the nuclear fuel.

Nuclear reactors are presently being designed, constructed and operated in which the nuclear fuel is contained in fuel elements which can have various geometric shapes, such as plates, tubes, or rods. The fuel material is usually enclosed in a corrosion-resistant, non-reactive, heat conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of a selfsustained fission reaction. The core in turn is enclosed within a reactor vessel through which a coolant is passed.

The cladding serves two primary purposes: first, to prevent contact and chemical reactions between the nuclear fuel and the coolant or the moderator if a moderator is present, or both if both the coolant and the moderator are present; and second, to prevent the radioactive fission products, some of which are gases, from being released from the fuel into the coolant or the moderator or both if both the coolant and moderator are present. Common cladding materials are stainless steel, aluminum and its alloys, zirconium and its alloys, niobium (columbium), certain magnesium alloys, and others. The failure of the cladding, i.e. a loss of the leak tightness, can contaminate the coolant or moderator and the associated systems with radioactive long-lived products to a degree which interferes with plant operation.

Problems have been encountered in the manufacture and in the operation of nuclear fuel elements which employ certain metals and alloys as the clad material due to mechanical or chemical reactions of these cladding materials under certain circumstances. Zirconium and its alloys, under normal circumstances, are excellent materials as a nuclear fuel cladding since they have low neutron absorption cross sections and at temperatures below about 600° F are strong, ductile, extremely stable and non-reactive in the presence of demineralized water or steam which are commonly used as reactor coolants and moderators. Within the confines of a sealed fuel element, however, the hydrogen gas generated by the slow reaction between the cladding and residual water inside the cladding may build up to levels which under certain conditions can result in localized hydriding of the alloy with concurrent local deterioration in the mechanical properties of the cladding. The cladding is also adversely affected by such gases as oxygen, nitrogen, carbon monoxide and carbon dioxide over a wide range of temperatures. Also, fuel element performance has revealed a problem with splitting of the cladding due to interactions between the nuclear fuel, the cladding and the fission products produced during nuclear fission reactions.

The zirconium cladding of a nuclear fuel element is exposed to one or more of the gases listed above and fission products during irradiation in a nuclear reactor and this occurs in spite of the fact that these gases may not be present in the reactor coolant or moderator, and further may have been excluded as far as possible from ambient atmosphere during manufacture of the cladding and the fuel element. Sintered refractory and ceramic compositions, such as uranium dioxide and other compositions used as nuclear fuel, release measurable quantities of the aforementioned gases upon heating, such as during fuel element manufacture and especially during irradiation. Particulate refractory and ceramic compositions, such as uranium dioxide powder and other powders used as nuclear fuel, have been known to release even larger quantities of the aforementioned gases during irradiation. These released gases are capable of reacting with the zirconium cladding containing the nuclear fuel. This reaction can result in the embrittlement of the cladding which endangers the integrity of the fuel element. Although water and water vapor may not react directly to produce this result, at high temperatures water vapor does react with zirconium and zirconium alloys to produce hydrogen and this gas further reacts locally with the zirconium and zirconium alloys to cause embrittlement. Release of these residual gases within the sealed metal-clad fuel element also increases the internal pressure within the element and thus introduces additional stresses in the presence of corrosive conditions. Only recently has it been discovered that these undesirable results are exaggerated by the localized mechanical stresses due to fuel-cladding differential expansion (localized stress at $UO_2$ cracks). Corrosive gases are released from the cracks in the fuel at the very point of localized stress at the intersection of the fuel cracks with the cladding surface. The localized stress is exaggerated by high friction between the fuel and the cladding.

Thus in light of the foregoing, it has been found desirable to minimize attack of the cladding from water, water vapor and other gases, especially hydrogen, reactive with the cladding inside the fuel element throughout the time the fuel element is used in the operation of nuclear powder plants. One such approach has been to find material which will chemically react rapidly with the water, water vapor and other gases to eliminate these from the interior of the cladding, and such materials are called getters.

Another approach has been to coat the nuclear fuel material with a ceramic to prevent moisture coming in contact with the nuclear fuel material as disclosed in U.S. Pat. No. 3,108,936. U.S. Pat. No. 3,085,059 presents a fuel element including a metal casing containing one or more pellets of fissionable ceramic material and a layer of vitreous material between the ceramic material and the casing, and the vitreous material is bonded to the ceramic pellets. This assures uniformly good heat conduction from the pellets to the casing. U.S. Pat. No. 2,873,238 presents jacketed fissionable slugs of uranium canned in a metal case in which the protective jackets or coverings for the slugs are a zinc-aluminum bonding layer. U.S. Pat. No. 2,849,387 discloses a jacketed fissionable body comprising a plurality of open-ended jacketed body sections of nuclear fuel which have been dipped into a molten bath of a bonding material giving an effective thermally conductive bond between the uranium body sections and the container (or cladding). The coating is disclosed as any metal alloy having good thermal conduction properties with examples including aluminum-silicon and zinc-aluminum alloys. Japanese Patent Publication No. SHO 47 -46559 discloses consolidating discrete nuclear fuel particles into a carbon-containing matrix fuel composite by coating the fuel particles with a high density, smooth carbon-containing coating around the pellets. Still another coating disclosure is Japanese Patent Publication No. SHO 47-14200 in which the coating of one of two groups of pellets is with a layer of silicon carbide and the other group is coated with a layer of pyrocarbon or metal carbide.

The coating of nuclear fuel material introduces reliability problems in that failure to achieve uniform coatings free of faults is difficult. Further, the deterioration of the coating can introduce problems with the long-lived performance of the nuclear fuel material.

Another approach has been to introduce a barrier or matal liner between the nuclear fuel material and the cladding holding the nuclear fuel material as disclosed in U.S. Pat. No. 3,230,150 (copper foil), German Patent Publication DAS No. 1,238,115 (titanium layer), U.S. Pat. No. 3,212,988 (sheath of zirconium, aluminum or beryllium), U.S. Pat. No. 3,018,238 (barrier of crystalline carbon between the $UO_2$ and the zirconium cladding), and U.S. Pat. No. 3,088,893 (stainless steel foil). While the barrier concept proves promising, several of the foregoing references involve incompatible materials with either the nuclear fuel (e.g. carbon can combine with the oxygen from the nuclear fuel), or the cladding (e.g. copper and other metals or carbon can diffuse into the cladding, altering the properties of the cladding), or the nuclear fission reaction (e.g. by acting as neutron absorbers).

The foregoing discussion of the prior art demonstrates that there exists a need for a fuel element having a gap between the nuclear fuel and the cladding which incorporates protection (1) inhibiting the mechanical interaction between the cladding and the nuclear fuel due to swelling or expansion of the fuel during operation, (2) isolates fission products produced in the fuel from the cladding and (3) improves the axial thermal peaking gradients along the length of the fuel rod.

Accordingly, it has remained desirable to develop nuclear fuel elements minimizing the problems discussed above.

SUMMARY OF THE INVENTION

It has now been surprisingly found that a refractory metal liner can be incorporated in a nuclear fuel element in the gap between the nuclear fuel and the cladding and provide the unexpected result of effectively protecting the fuel element against mechanical interaction between the nuclear fuel and the cladding, isolate the fission products produced by the nuclear fuel from contact with the cladding and improve the axial thermal peaking gradient along the fuel element. The refractory metal liner can be incorporated in the fuel element in various embodiments such as in the form of a vapor deposited film on the internal surface of the cladding, as a hollow cylindrical tube surrounding the nuclear fuel and contained within the cladding and as a single or double wrap of foil around the nuclear fuel. The refractory metals used in this invention include molybdenum, tungsten, rhenium, niobium and alloys of the foregoing.

OBJECTS OF THE INVENTION

From the foregoing discussion, it is apparent that it is a principal object of this invention to provide an improved nuclear fuel element incorporating a refractory metal liner or barrier between the nuclear fuel and the cladding.

It is another object of this invention to provide a nuclear fuel element capable of operating in nuclear reactors for extended periods of time without the occurrence of splitting of the cladding, corrosion of the cladding, or other longevity fuel failure problems.

Another object of this invention is to provide a refractory metal barrier in a nuclear fuel element in the form of a coating on the internal surface of the cladding to serve as a physical barrier to prevent the fission products from the nuclear fuel from contacting the cladding.

Still another object of this invention is to provide a refractory metal liner in a nuclear fuel element in the form of hollow cylindrical tubing positioned in the gap between the nuclear fuel and the cladding to serve as a physical barrier to prevent the fission products from the nuclear fuel from contacting the cladding.

Yet another object of this invention is to provide a refractory metal liner in a nuclear fuel element in the form of a wrapped foil, either as a single wrap or double wrap, surrounding the nuclear fuel and serving as a physical barier to prevent the fission products from the nuclear fuel from contacting the cladding.

Still another object of this invention is to protect the cladding of a nuclear fuel element from exposure to fission products and reactive gases from the nuclear fuel material and minimize the corrosion of the cladding.

The foregoing and other objects of this invention will become apparent to a person skilled in the art from reading the following specification and the appended claims with reference to the accompanying drawings described immediately hereinafter.

DESCRIPTION OF THE INVENTION

Figure 1:
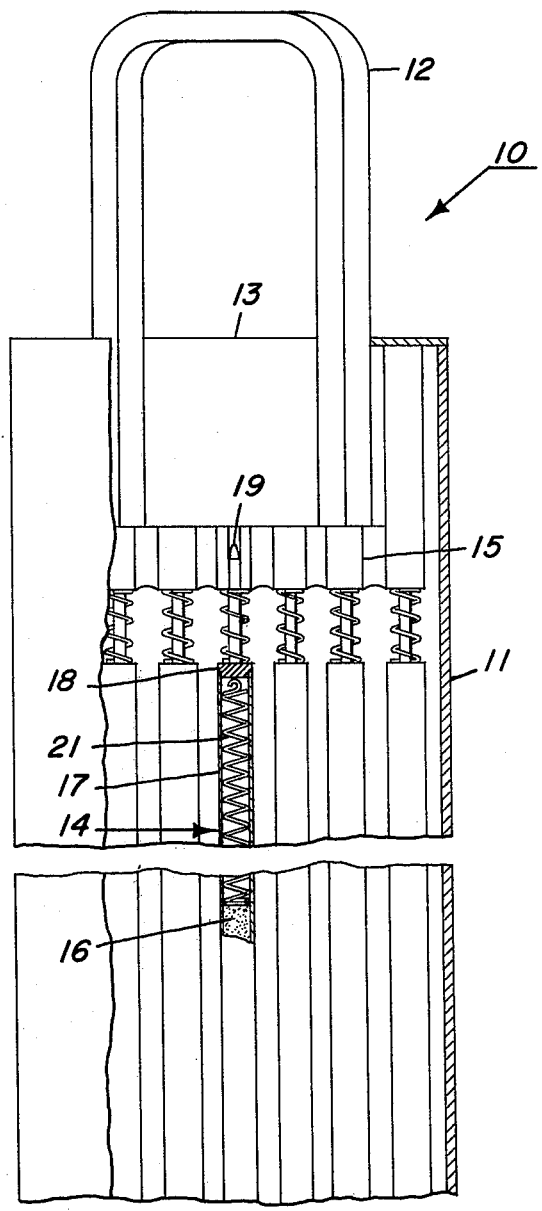
FIG. 1 presents a partial sectional view of a nuclear fuel assembly containing nuclear fuel elements constructed according to the teachings of this invention.

Referring now more particularly to FIG. 1, there is shown a partial sectional view of a nuclear fuel assembly 10. This fuel assembly consists of a tubular flow channel 11 of generally square cross section provided at its upper end with lifting bale 12 and its lower end with a nose piece (not shown due to the lower portion of assembly 10 being omitted). The upper end of channel 11 is open at 13 and the lower end of the nose piece is provided with coolant flow openings. An array of fuel elements 14 is enclosed in channel 11 and supported therein by means of upper end plate 15 and a lower end plate (not shown due to the lower portion being omitted). The liquid coolant ordinarily enters through the openings in the lower end of the nose piece, passes upwardly around fuel elements 14, and discharges at upper outlet 13 in a partially vaporized condition for boiling reactors or in an unvaporized condition for pressurized reactors.

Figure 2:
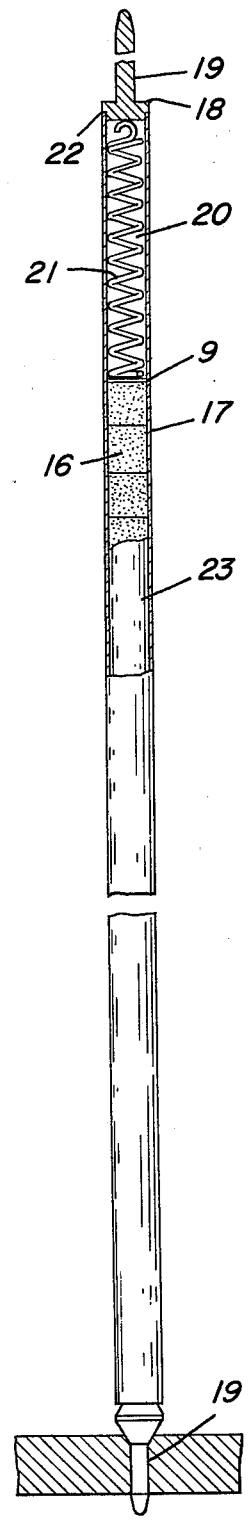
FIG. 2 shows a partial longitudinal sectional view of a nuclear fuel rod with a portion of the rod containing the nuclear fuel being cut away for convenience of illustration of the refractory metal liner.

Referring now to FIG. 2 in addition to FIG. 1, a nuclear fuel element or rod 14 is shown in partial longitudinal section. The fuel element includes fuel material 16, here shown as a plurality of fuel pellets of fissionable and/or fertile material positioned within a structural cladding or container 17. In some cases the fuel pellets may be of various shapes such as cylindrical pellets or spheres, and in other cases different fuel forms such as particulate fuel may be used. The physical form of the fuel is immaterial to this invention. Various nuclear fuel materials may be used including uranium compounds, plutonium compounds, thorium compounds, and mixtures thereof. A preferred fuel is uranium dioxide or a mixture comprising uranium dioxide and plutonium dioxide. The container is sealed at its ends by means of end plugs 18 which may include studs 19 to facilitate the mounting of the fuel rod in the assembly. A void space or plenum 20 is provided at one end of the fuel element to permit longitudinal expansion of the fuel material and accumulation of gases released from the fuel material. A helical member 21 resting on top plate 9 is positioned within space 20 and is capable of maintaining the position of the fuel during handling and transportation of the fuel elements. Cladding 17 is secured to end plugs 18 by means of circumferential welds 22.

The fuel element is designed to provide an excellent thermal contact between the fuel cladding and the fuel material, a minimum of parasitic neutron absorption and resistance to bowing and vibration which is occasionally caused by flow of the coolant at high velocity.

FIG. 2 shows one embodiment of this invention in which a refractory metal liner or barrier 23 is positioned to surround the nuclear fuel material 16 with the liner 23 running the length of the column of nuclear fuel material 16 from top plate 9 to the bottom end plug.

Figure 3:
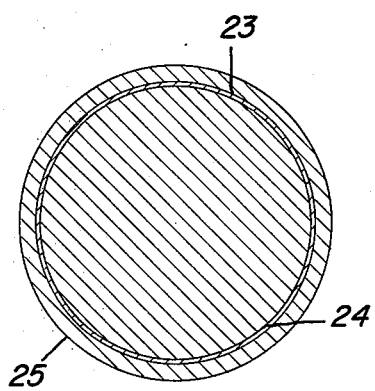
FIG. 3 presents an enlarged transverse sectional view of a nuclear fuel element containing a refractory metal liner in the form of a hollow cylindrical tubing positioned in the gap between the nuclear fuel and the cladding.

FIG. 3 shows an enlarged transverse sectional view of a nuclear fuel element containing a refractory metal liner 23 in the form of a hollow cylindrical tube positioned in the gap between the nuclear fuel material 24 and the cladding 25. The nuclear fuel material 24 is typically a multiplicity of cylindrical pellets placed end to end to form a column. The cladding 25 is typically a zirconium alloy which is sealed at its ends by means of end plugs which may include studs as previously discussed. The liner 23 consists of a refractory metal selected from the group consisting of molybdenum, tungsten, rhenium, niobium and alloys of the foregoing. The liner 23 is impervious to fission products and gases emitted by the fuel material 24 and while the ends of the liner can be sealed by a cap it is preferred to leave the ends open since a minimum of fission products and reactive gases from the fuel material will pass around the ends of the liner to contact the cladding, and it is more probable that the gaseous materials including gaseous fission products will travel to the plenum area in the nuclear fuel element. The thickness of the liner is sufficient to resist forces encountered in assembling the fuel and gas pressures encountered during operation of the nuclear reactor and a preferred thickness for the liner is in the range of about ½ to about 12 mils. The fuel element is assembled by first placing the liner in the cladding which has one end plug secured in place such as by welding and the other end of the cladding is open. The fuel material is preferably in the form of cylindrical pellets and these are placed inside the liner. A helical member is then placed inside the cladding, e.g., on a top plate resting on the top most pellet, and an end closure is effected with an end plug 18. In one preferred assembly the cladding is evacuated of atmosphere and filled with an inert atmosphere such as helium. As assemblied there are small gaps between the fuel material 24, the liner 23 and the cladding 25.

Figure 4:
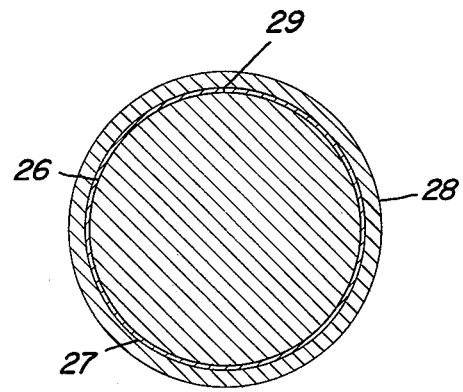
FIG. 4 illustrates an enlarged transverse sectional view of a nuclear fuel element containing a refractory metal liner in the form of a singly wrapped foil surrounding the nuclear fuel with an overlap at the junction of the ends of the foil.

FIG. 4 presents an enlarged transverse sectional view of another embodiment of the nuclear fuel element containing a refractory liner 27 in the form of a singly wrapped foil with an overlap connection 29 positioned in the gap between the nuclear fuel material 26 and the cladding 28. The nuclear fuel material 26 is typically a multiplicity of cylindrical pellets placed end to end to form a column. The cladding is typically a zirconium alloy which is sealed at its ends by means of end plugs which may include studs as previously discussed. The liner 27 consists of a refractory metal as set forth in the discussion concerning FIG. 3, and the liner is impervious to fission products and gases emitted by the fuel material 26. The assembly of the fuel element is similar to that described for FIG. 3 and the thickness of the foil is typically in the range of about ½ to about 3 mils.

Figure 5:
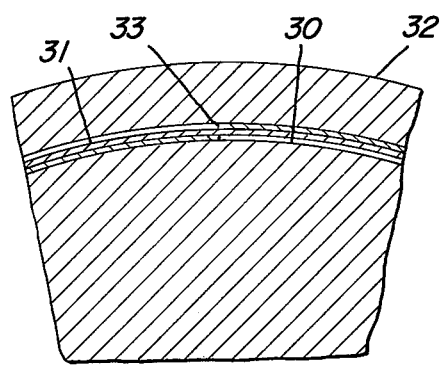
FIG. 5 presents a portion of an enlarged transverse sectional view of a nuclear fuel element containing a refractory metal liner in the form of a doubly wrapped foil surrounding the nuclear fuel with an overlap at the junction of the ends of the foil.

Another embodiment is presented in FIG. 5 which shows a portion of an enlarged transverse sectional view of the nuclear fuel element containing a refractory liner 31 in the form of a doubly wrapped foil with an overlap connection 33 positioned in the gap between the nuclear fuel material 30 and the cladding 32. The nuclear fuel material is typically a multiplicity of cylindrical pellets placed end to end to form a column. The cladding, the liner and the nuclear fuel are of the same composition as discussed for the preceding Figures. The assembly of the fuel element is similar to the foregoing description, and the liner is impervious to fission products and reactive gases from the nuclear fuel material.

Figure 6:
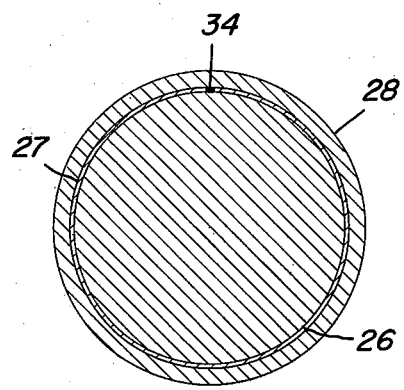
FIG. 6 shows an enlarged transverse sectional view of the nuclear fuel element of FIG. 4 containing a welded refractory metal liner in the form of a singly wrapped foil surrounding the nuclear fuel with the ends of the foil being joined by a weld.

FIG. 6 illustrates the nuclear fuel element of FIGS. 4 with the same numbers being used in FIG. 6 for the components of FIG. 4 in which a weld 34 has been made to secure the ends of the refractory metal liner 27. This provides an impervious seal running the length of the hollow column of the refractory metal liner.

Figure 7:
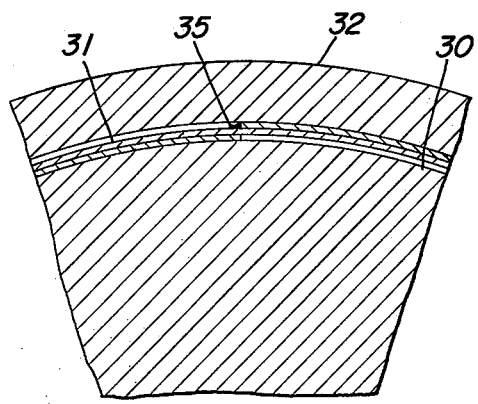
FIG. 7 illustrates a portion of an enlarged transverse sectional view of a nuclear fuel element containing a refractory metal liner in the form of a doubly wrapped foil surrounding the nuclear fuel with the end of the foil being joined to the foil by a weld.

In FIG. 7, a similar weld 35 is shown for the nuclear fuel element of FIG. 5 with the same numbers being used in FIG. 7 for the components of FIG. 5. The weld 35 is used to fasten the end of the refractory metal liner 31 to itself. This provides an impervious seal running the length of the hollow column of the refractory metal liner.

Figure 8:
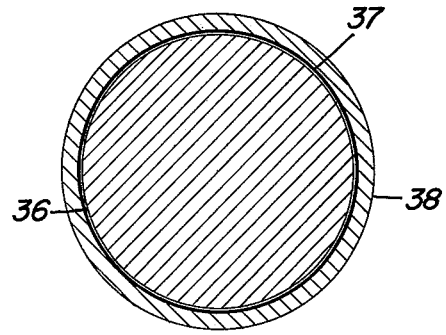
FIG. 8 presents an enlarged transverse sectional view of a nuclear fuel element containing a refractory metal barrier in the form of a coating on the internal surface of the cladding serving as a physical barrier to prevent the fission products from the nuclear fuel from contacting the cladding.

Another embodiment is shown in FIG. 8 in which a liner or barrier in the form of a coating 37 of a refractory metal adhers to and covers the inside surface of the cladding 38 to form a barrier against fission products from the nuclear fuel material 36 contacting the cladding 38. The coating 37 is applied to the cladding 38 for a sufficient time prior to assembling the fuel rod so that the cladding is at room temperature. Then the fuel material, typically in the form of pellets, is loaded into the cladding followed by insertion of a helical member, filling the tube with inert gas and welding the end plug on the cladding. The composition of the refractory metal coating is as previously set forth and the thickness of the coating is in the range of about ½ to about 1½ mils. This forms an impervious coating to the passage of reactive gases and fission products.

The assembly or deposition of the refractory metal liner or barrier will be now discussed. When the refractory metal liner is used in the form of a hollow cylindrical tube as in FIG. 3, the tube is typically extruded. The tube can also be formed from sheet by welding with the use of laser or ultrasonic welding processes. When either a single or double wrap of foil is used as the liner, the refractory metal liner is assembled by wrapping around a mandrel, such as a metallic mandrel, and then the mandrel is withdrawn. The ends are clipped in place or pressure folded into place. The mandrel is selected so that there will be a gap around the nuclear fuel material for ease of loading the nuclear fuel material after the liner is inserted in the cladding. This insures that the singly or doubly wrapped foil will be straight inside the cladding and have a uniform opening for receiving the nuclear fuel material. The refractory metal liner or barrier in the form of a coating is applied to the inside surface of the cladding by vapor deposition until a typical coating in the range of about ½ to 1½ mils is achieved. In one practice, this vapor deposition is achieved by introducing the refractory metal in the form of a gaseous compound (e.g., $WF_6$, $MoF_6$) into the cladding and using an induction heating means surrounding the cladding to heat the cladding sufficiently to deposit a coating of the refractory metal on the inside surface of the cladding.

The nuclear fuel material in the form of pellets of small right cylindrical cylinders is loaded by using a tray with a groove and the cylinders of fuel material are placed in the groove. The groove is aligned with the opening in the cladding which has the refractory metal barrier, liner or coating therein and then the pellets are fed into the cladding.

The design of these fuel elements has a gap between the nuclear fuel material and the refractory metal liner. Further except for the coating shown in FIG. 8, there will be a gap between the cladding and the refractory metal liner.

The refractory metal liners or barriers of this invention prevent mechanical interaction between the nuclear fuel material and the cladding and further due to the gap initially present between the fuel material and the liner minimize the stress applied to the barrier. The liner minimizes contact of reactive gases and fission products from the nuclear fuel material with the cladding and improves the axial thermal peaking gradient along the length of the fuel rod. Since the thermal conductivity of the refractory metals used in this invention is greater than that of the cladding, such as zirconium, zirconium alloys or stainless steel, any thermal peaking resulting from flux peaking will be reduced. In effect the refractory metal liner will minimize any concentration of heat in the nuclear fuel element due to the excellent thermal conductivity of the liner.

Molybdenum and molybdenum alloys are preferred refractory metals for use in this invention due to their high melting points (e.g., 2615° C for molybdenum) which are directly related to the resistance of the liner to diffuse into the cladding. Further the coefficient of expansion of molybdenum and its alloys closely approaches that of the preferred cladding, namely the Zircaloy series of alloys. Further molybdenum and its alloys show resistance to fission products such as cesium. Further as stated molybdenum and its alloys have high thermal conductivity thus not introducing any appreciable heat barrier in the nuclear fuel element.

EXAMPLE

Several cylindrical nuclear fuel elements containing molybdenum liners are constructed for operation in a test reactor. The molybdenum liners are in the form of single wraps of molybdenum foil with an overlap of about one-eighth to about one-fourth inch as wrapped. The length of the fuel elements is about 41 inches and the length of the cylindrical columns of nuclear fuel in fuel elements is about 36 inches and 30 inches of the nuclear fuel column are enriched nuclear fuel. Except for the overlap the thickness of the molybdenum liner is about ½ mil. The outside diameter of the zirconium cladding of the fuel elements is about 0.562 inch and the thickness of the cladding is about 32 mils. The inside diameter of the molybdenum liner is about 0.499 inch and the diameter of the cylindrical nuclear fuel pellets is about 0.489 inch.

The fuel elements as assembled are inserted into an operating nuclear test reactor, and the testing of the fuel elements proceeds favorably.

It is to be understood that, although the invention has been described with specific reference to particular embodiments thereof, it is not to be so limited, since changes and alterations therein may be made which are within the full intent and scope of this invention as defined by the appended claims.

What is claimed is:

1. A nuclear fuel element comprising: an elongated cladding tube having the form of a right circular cylinder and formed of a material from the group consisting of zirconium and zirconium alloy; a body of nuclear fuel material disposed in said container with an annular gap between said fuel material and said tube; a liner formed of a material from the group consisting of molybdenum and molybdenum alloy disposed in said annular gap between said fuel material and said tube and partially filling said gap to provide an interaction barrier between said cladding tube and said fuel material and to provide an initial gap between said liner and said fuel material; and means for sealing each end of said tube.

* * * * *